Aug. 17, 1965   R. L. THORNE   3,201,641
STROBOSCOPIC DISPLAY WITH SAMPLE-AND-HOLD CIRCUIT
Filed Feb. 27, 1963   2 Sheets-Sheet 1
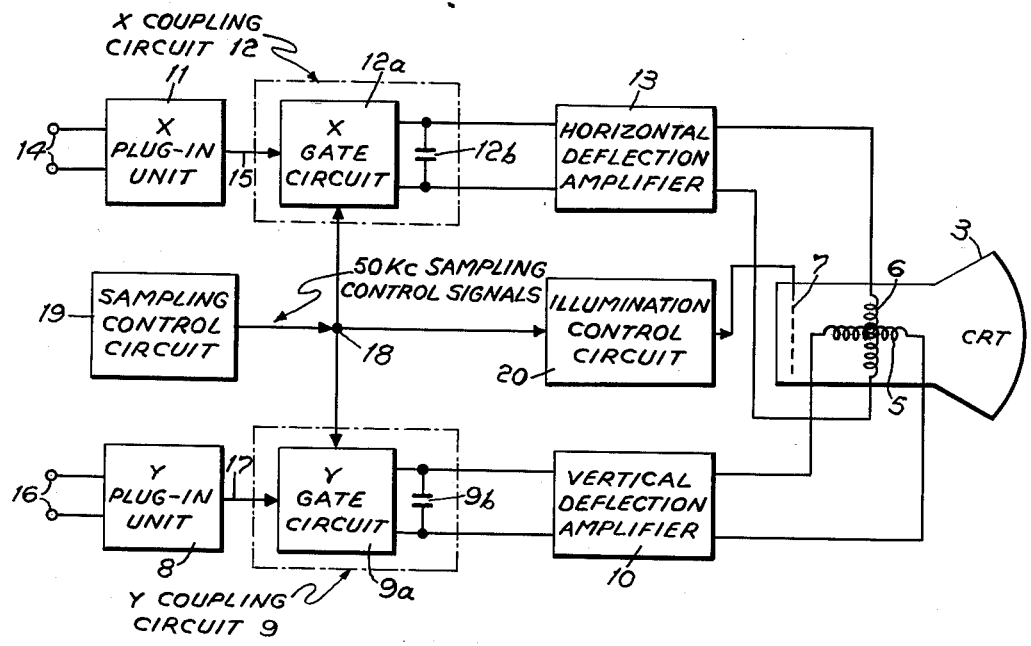
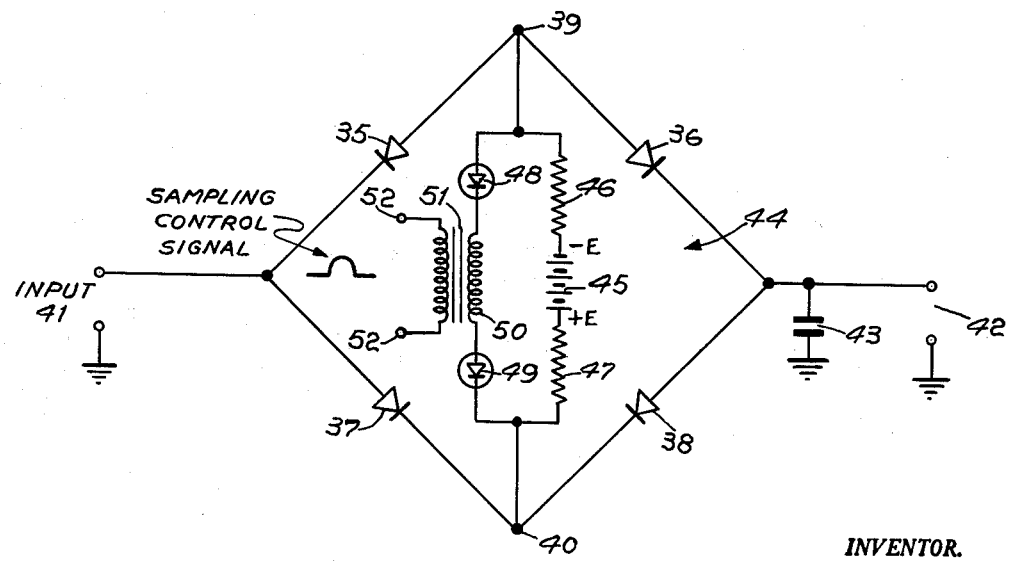
INVENTOR.
ROBERT L. THORNE
BY Robert Lieber
ATTORNEY

United States Patent Office 3,201,641
Patented Aug. 17, 1965

3,201,641
STROBOSCOPIC DISPLAY WITH SAMPLE-AND-HOLD CIRCUIT
Robert L. Thorne, Los Angeles, Calif., assignor to International Telephone and Telegraph Corporation, Nutley, N.J., a corporation of Maryland
Filed Feb. 27, 1963, Ser. No. 261,307
3 Claims. (Cl. 315—22)

This concerns an indicating system of the stroboscopic sampling type for producing an indication which is perceived as a continuous waveform display of a number of successive cycles of a periodic input signal, but which is actually a composite display of variably spaced discrete samples of the input signal. Also of interest is the design of a "sample-and-hold" coupling circuit used herein, which circuit, as implied by the designation, is intermittently actuated to sample the input signal and to thereafter maintain a constant output corresponding to the sampled input until the time of occurrence of the next sampling actuation.

In previous stroboscopic sampling systems, the practice has been to limit the frequency of the sampling control signals to one sample per cycle of the input signal, and to further restrict the durations of the sampling control signals to an order of magnitude considerably less than the period of the highest frequency component in the input signal being sampled. Such frequency and duration restrictions were hitherto considered necessary to ensure high resolution and fidelity in the composite display indication, because the exact instant of sampling, within any sampling interval, is somewhat indeterminate—being a function of the sampling circuitry, random noise, and other phenomena—and hence the sampled values were deemed correspondingly indeterminate within a range determined by the slope of the input signal waveform over the interval defined by the sampling signal duration.

Disadvantages of the above frequency limitation are that the associated system cannot accommodate low frequency input phenomena without excessive blinking or discontinuity in the indication, and that the system controls are complicated by the need for sampling signals of variable frequency, as well as the need for manuipulation of switches to select the sampling frequency. The chief disadvantage of the duration restriction is that it imposes severe bandwidth restrictions on the design of the circuits which handle the sampling actuation control signals and other signals related thereto.

Accordingly, an object of this invention is to provide an improved indicating system, of the stroboscopic sampling type, characterized by efficiency, simplicity of construction, and by high resolution and fidelity in the indication.

Another object is to provide a high-resolution indicating system of the stroboscopic type wherein the repetition frequency of the sampling control signal is arbitrarily determined in relation to the frequency of the input signal being sampled and wherein the duration of the sampling signal is arbitrarily determined in relation to the period of the highest frequency component of said input signal.

Another object is to provide an indicating system of the stroboscopic sampling type having a simplified design such that the sampling circuits and indicating components can be separately situated in remotely stationed units with a relatively simple transmission cable connecting said units.

Another object is to provide a sample-and-hold coupling circuit in which the disablement of the circuit in association with the termination of a sampling control signal occurs within a relatively brief time interval in comparison to the over-all duration of the said control signal termination, and also in comparison to the period of the highest frequency component in the input signals being sampled.

Still another object is to provide a rapidly disabled sample-and-hold coupling circuit which exhibits higher impedance, when completely disabled, than other coupling circuits, which also requires an enabling signal of smaller amplitude than other coupling circuits, and which passes from the enabled condition to the disabled condition more rapidly than other circuits.

A feature of the present invention resides in the provision of an indicating system in which signals in a plurality of input channels—said signals representing coordinate components of a vector variable which is to be displayed—are intermittently sampled, and quiescently stored during the intervals between samples, and in which each quiescently stored condition is determined during a brief portion of the time interval defined by the termination of the enabling signal which initiates the sampling. Thus, the complete durations of the sampling control signals are of no concern herein, only the terminal portion of each control signal being of interest. The quiescently stored conditions are applied to the positional controls of an indicating spot producing device—e.g. the deflection controls of a cathode ray tube—and blanking signals corresponding to the relatively unrestricted sampling control signals are applied to inhibition controls of the same spot producing device so that visible spots are produced only during the said intervals of quiescent storage.

According to one aspect of the invention I employ sampling control signals having a constant frequency of 50 kc., to stroboscopically display periodic input signals having any spectral frequency distribution in the range extending from D.C. to 5 megacycles. It is then a relatively simple matter to design circuits for handling the sampling control signals and also for handling the signals applied to the inhibition controls of the spot producing device. Consequently, it is also a relatively simple matter to design the indicating system for remote placement of the indicating components and coupling circuits in separately housed units, with a connecting cable of relatively simple design coupling the units. The utility and versatility of this last feature should be self-evident.

A subsidiary, but quite important, feature involves the design of a sample-and-hold coupling circuit, comprising a four terminal, normally disabled, diode bridge circuit arrangement for coupling signals between a pair of terminals—one connected to an input circuit and the other to an output circuit—in response to sampling control signals applied between the remaining two terminals of the bridge. In the present design two branch circuits are connected in shunt between the said remaining two terminals of the bridge. One of the branch circuits comprises a pair of similarly poled voltage breakdown elements (e.g. Zener diodes) connected in series circuit, with means (e.g. a transformer) for apply sampling control signals thereto. The other branch circuit comprises a high impedance constant voltage source which reverse biases all of the bridge diodes and also reverse biases the voltage breakdown elements in the direction of the associated threshold breakdown voltage. The effect of the bias voltage on the first-mentioned branch circuit is to reduce the predetermined threshold at which voltage breakdown occurs, thereby reducing the elapsed time between the commencement or termination of voltage breakdown and the time of initiation or termination, respectively, of a sampling control signal applied to the voltage breakdown elements. This reduction in elasped time corresponds to a reduction in the characteristic sampling interval associated with the bridge circuit, regardless of the duration of the sampling control signals applied to the breakdown elements. As an incidental benefit, the required amplitude of the sampling control signals is reduced.

These and other objects and features of the present invention will be more readily appreciated and understood when considered in connection with the following description which is to be read in connection with the accompanying drawings wherein:

FIGURE 1 is a schematic block diagram of an indicating system arranged in accordance with the present invention;

FIGURE 2 is a schematic circuit diagram illustrating a coupling circuit designed in accordance with the invention.

Figure 3:
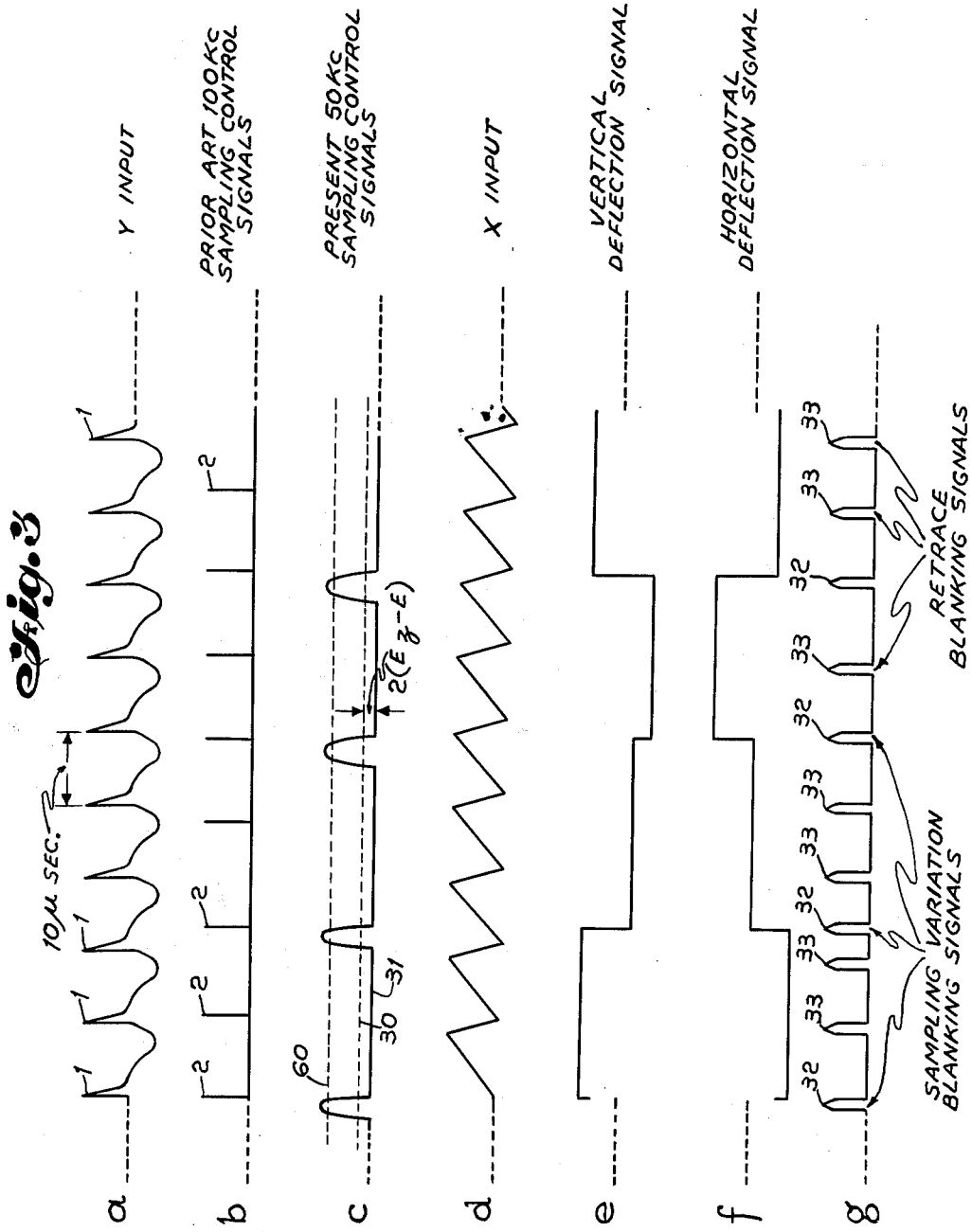
FIGURE 3 is a timing diagram illustrating the relationships between various signals associated with the system of FIGURE 1, and also illustrating prior art sampling control signals.

Referring first to FIGURE 3 for an understanding of the sampling problem which is solved by means of the present invention, timing chart (a), in FIGURE 3 illustrates a periodic input waveform, each cycle of which includes a narrow peak 1, the spectrum of which includes high frequency signal components. As shown in chart (a), the frequency and period of the input waveform, are chosen for illustrative purposes to be 100 kc. and 10 microseconds, respectively, although it will be clear from the ensuing discussion that the present invention is capable of accommodating a wide spectral distribution of input frequencies (e.g. zero to 5 megacycles). As indicated in chart (b) of FIGURE 3, the prior art sampling control pulses, are rather narrow pulses 2 recurring at approximately the same frequency as the input signal shown in chart (a), and having a duration which is small in comparison to the highest frequency component in the signal of chart (a). It is clear that if the latter duration were extended, the probability of a series of samples coinciding with all of the points of the narrow peak, would be lessened. Thus, it should be clear that the prior art circuits which handle the signals 2, of timing chart (b), must be very carefully designed to provide the necessary bandwidth therefor.

Referring to FIGURES 1 and 3 for an understanding of the technique of the present invention by means of which the use of short duration sampling control pulses is avoided, the following may be observed. As shown in FIGURE 1, the sampled indications are produced on the face of a cathode ray tube (CRT) 3. The position of the indicating spot on the face of the CRT is determined by the signals jointly applied to the vertical and horizontal deflecting elements 5 and 6 therein, and the illumination of the indicating spot is determined by the signals applied to the grid element 7. The signals applied to vertical deflecting element 5 are coupled through a plurality of "Y" circuits, including a plug-in unit 8, a coupling circuit 9, and a vertical deflection amplifier 10. Amplifier 10 is preferably an operational amplifier (i.e. a D.C. amplifier with feedback), of the type used in analog computers for multiplying an input voltage by a constant co-efficient, while presenting a virtually infinite impedance to the input voltage. The need for such amplifiers will be clear from the discussion of the coupling circuits connected thereto.

Similarly, the horizontal deflection signal is determined by an "X" network including an X plug-in unit 11, an X coupling circuit 12, and an X deflection amplifier 13 which is identical to the Y deflection amplifier 10.

The Y and X coupling circuits 9 and 12 are also identical, and each includes a gating circuit and an output capacitor. The Y gating circuit is designated 9a and the Y output capacitor is designated 9b. Similarly, the X gating circuit is designated 12a and the X output capacitor is designated 12b.

The plug-in units 8 and 11 are selected from a plurality of standard plug-in units. If, for example, it is desired to display as an ordinate, a few cycles of a periodic waveform with time as the abscissa, then a preamplifier is inserted as the Y plug-in unit, to translate an input signal such as that in FIGURE 3(a), from input terminals 16, to the output indicated schematically at 17, and a sawtooth sweep generator, which generates a signal such as that shown in FIGURE 3(d) is inserted as the X plug-in unit. In this example the sweep generator may be synchronized via signals applied at the X input terminals 14, and the sweep output appears at 15.

The X and Y coupling circuits 9 and 12 operate in response to control signals at junction 18, to couple their respective input and output circuits, in a manner to be described. The signals appearing at 18 are produced by a sampling control circuit 19, and in an exemplary arrangement, these signals recur periodically at a frequency of 50 kc. An illumination control circuit 20 is also responsive to the signals at 18, to produce blanking signals which are applied to the intensity control element 7 of tube 3. Circuit 20 also produces retrace blanking signals during sweep retrace intervals.

In considering the operation of the system shown in FIGURE 1, the explanation will be confined solely to the Y circuits associated with vertical deflecting element 5 of cathode ray tube 3 since an identical process takes place in the X circuits. In operation, fixed frequency 50 kc. sampling signals are applied to gate circuit 9a, which is so constructed that the charge which remains stored on capacitor 9b, when the gate is completely disabled, is determined during a very brief predetermined interval associated with the termination of the last previous sampling control signal, and corresponds to some value of the input signals present at 17 during said predetermined interval. Thus, to all intents and purposes the duration of each sampling signal with respect to the actual determination of the quiescently stored charge is extremely brief, although the actual duration of the sampling signal may be relatively long. The charge stored on capacitor 9b is applied to the operational amplifier 10, the high impedance of which prevents leakage of the stored charge from the capacitor.

As previously noted, the control circuit 20 produces blanking signals during the sampling intervals, in response to the sampling control signals. Thus, the indicating spot on the face of tube 3 will be illuminated only during intervals in which the charge on capacitor 9b is invariant. Consequently, during each period of illumination the indicating spot remains fixed at a point determined by the outputs of the deflection amplifiers 10 and 13. Thus, assuming that the X and Y phenomena are relatively synchronous, and that the instants of termination of the sampling control signals at 18 are relatively random in relation to the X and Y phenomena, as is the case in the system arrangement of FIGURE 1, it will be appreciated that every point along the curve representative of one cycle of the input phenomena, will ultimately be illuminated within a very short period of time. It will also be appreciated that at a sampling rate of 50 kc. the resultant output indication will be perceived as a continuous curve, despite the fact that adjacent illuminated spots may have occurred in different sampling intervals. It has been found that the exemplary arrangement just described is effective to accommodate input phenomena having a spectral band-width of anywhere from zero to 5 megacycles.

Referring to FIGURE 3, the above-mentioned 50 kc. sampling control pulses, the period of which is therefore 20 microseconds, are shown in timing chart (c). The above-mentioned brief interval, in which the stored sample of charge is completely determined, lies between the intersections of the sampling control pulse with the dotted line 30 and the reference line 31. The outputs of the deflection amplifiers 10 and 13 are respectively shown in timing charts (e) and (f), and the blanking control output of the circuit 20 is shown in timing chart (g). It is clear from the various timing charts just mentioned, that the deflection amplifier outputs are staircase type waveforms, and further that the output of the circuit 20 includes blanking pulses which overlap the stepped portions of the amplifier outputs in time, so that the indicating spot is illuminated only while the amplifier outputs are in stable quiescent conditions. These blanking pulses are designated sampling variation blanking, and are identified by the numeral 32 in chart (g). In addition it is noted that retrace blanking pulses 33, indicated in chart (g) are produced via the control circuit 20, these serving to blank the indicating spot during periods of retrace of the sweep signal shown in chart (d).

The design of the gate circuits 9a and 12a, which circuits are identical, is explained with reference to the circuit diagram of FIGURE 2. This circuit comprises a diode bridge circuit arrangement including four diodes 35, 36, 37, and 38, all of which are poled in the same sense relative to diagonal terminals 39 and 40 of the bridge. The input to the bridge circuit, which represents the signal at either 15 or 17 in FIGURE 1, is indicated at 41 in FIGURE 2, and the output of the bridge is generally indicated at 42. The capacitor designated 43 in FIGURE 2 is representative of either capacitor 9b or 12b of FIGURE 1.

The foregoing is fairly standard. What is believed to be new and unusual about the present bridge circuit is the control arrangement connected between terminals 39 and 40, within the parallelogram defined by the bridge elements, which arrangement is indicated generally by the arrow 44. This control arrangement includes a first circuit comprising the D.C. supply 45, and the resistors 46 and 47, all connected in series circuit between the terminals 39 and 40 of the bridge. This first circuit supplies bias potentials to the diagonal terminals 39 and 40, the polarities of which are in opposition to the direction of forward conduction of the bridge diodes 35 to 38. Shunting the first circuit there is provided a second series circuit including a pair of Zener diodes or similar voltage breakdown elements, indicated at 48 and 49, respectively, and the secondary coil 50 of a transformer indicated generally at 51. The sampling control signals are applied at 52 to the primary of transformer 51.

The operation of the foregoing circuit is explained with reference to chart (c) in FIGURE 3 as follows. The diodes 35 to 38 are preferably all matched components having substantially identical characteristics and, similarly, the voltage breakdown elements 48 and 49 are preferably matched elements having identical breakdown threshold potentials $E_z$. It will thus be appreciated that the breakdown elements would normally be broken down and pass forward current through the bridge diodes if a pulse exceeding $2E_z$ in the reverse breakdown direction were applied to the secondary 50 of transformer 51. It is obvious of course that a pulse of opposite polarity would have no effect on the bridge since the bridge diodes are reverse biased with respect to such a pulse.

The effect of the bias potential supplied by source 45 is to reduce the threshold voltage at which the elements 49 and 48, are broken down, in response to signals on secondary 50. Assuming that the potential at terminal 39, due to source 45, is $-E$, where E is a positive quantity, and assuming further that the potential at terminal 40 is $+E$ it may be seen that the threshold breakdown potential presented to the signals on the transformer secondary 50, is given by the expression $2(E_z-E)$. This is clearly illustrated in chart (c) in FIGURE 3 wherein the dotted line 60 represents the normal breakdown threshold level $2E_z$ while the dotted line 30 represents the threshold $2(E_z-E)$. It should be readily appreciated that the threshold represented by dotted line 30 need only be high enough to preclude breakdown of the elements 48 and 49 by noise signals. It should also be appreciated that the timing interval during which the charge to be stored quiescently on capacitor 43—corresponding to a sample of the input at 41—is completely determined by and lies between the abscissae corresponding to the negative-going intersections of the sampling control pulses 60 with the respective reference lines 30 and 31 of chart (c) in FIGURE 3. More particularly it will be appreciated that upon application of a control signal exceeding the threshold $2(E_z-E)$ to the secondary 50 of transformer 51, in the circuit of FIGURE 2, the Zener diodes 48 and 49 break down and pass forward conduction current through the bridge diodes 35 to 38. There is then a low impedance circuit connection effectively introduced between input circuit 41 and output capacitor 43. Thereafter, when the control signal on secondary 50 passes in the negative-going sense through the threshold breakdown level $2(E_z-E)$, the coupling connection between the input and output circuit is effectively opened, and therefore the sampled charge quiescently stored on capacitor 43 is determined during the terminating portion of the control signal.

Upon removal of the coupling connection between the input and output circuits the impedance between capacitor 43 and input circuit 41 is quite high, and the coupling threshold for signals appearing at input 41 or at output capacitor 43 is determined solely by the voltage breakdown potential $2E_z$ of Zener diodes 48 and 49, independent of the bias voltage $2E$ across terminals 39 and 40. Considering, for example, the circuit impedance presented to a positive signal stored on capacitor 43 while a less positive, or negative, signal is present at input 41, the lowest impedance coupling path between these two points is through the forward impedance of bridge diode 38, the reverse impedance of Zener diode 49, the secondary 50, the reverse impedance of Zener diode 48, and the forward impedance of bridge diode 35. In this coupling path the bias voltage $2E$ is applied in shunt with the signal potential on capacitor 43 relative to the breakdown elements 48 and 49, so that in this instance the bias voltage and the voltage on capacitor 43 are not additive with respect to the production of breakdown. The same considerations will be seen to apply, by virtue of the circuit symmetry, to all other coupling paths between the input and output circuits.

While I have described the principles of my invention in connection with specific apparatus, it is to be clearly understood that this description is given only by way of example and not as a limitation to the scope of my invention as set forth in the objects thereof and in the accompanying claims.

What is claimed is:
1. In an indicating system, the combination of:
    means for producing an indicating spot;
    a coupling circuit coupled to said spot producing means;
        said coupling circuit comprising:
            a normally disabled bridge circuit having first and second pairs of diagonally opposed terminals;
            means for applying an input signal to one terminal of said first pair of terminals;
            means connected to the other terminal of said first pair for storing a signal;
            first means connected between the terminals of said second pair of terminals for applying sampling control signals, having amplitudes in excess of a given amplitude, to said bridge; and
            second means connected across the said second pair of terminals for applying a constant bias potential in series aiding with the sampling control signals applied by said first means and in shunt circuit with signals conveyed between said one and said other terminals of said first pair relative to said first means, for establishing a bias between said second pair of terminals which tends to reduce the said given amplitude above which said control signals are transferred by said first means; and
    a source of constant frequency, constant duration, control signals, coupled to said first means of said coupling circuit, and to said spot producing means, for intermittently actuating said bridge circuit to couple signals between said one and said other terminals of said first pair, while coincidentally inhibiting production of said indicating spot.

2. A sample-and-hold coupling circuit comprising:

a normally disabled diode bridge circuit having first and second pairs of diagonally opposed terminals;

means coupled to one terminal of said first pair for applying input signals to said bridge;

means coupled to the other terminal of said first pair for receiving and storing signals coupled thereto from said one terminal via said bridge;

first means connected between the terminals of said second pair for coupling signals of a given polarity, in excess of a threshold amplitude, to said second pair to bias all of the diodes in said bridge into the forward-conduction states thereof; and second means connected between the terminals of said second pair for reverse biasing said bridge diodes while acting in series aiding with signals applied to said first means in determining said threshold amplitude.

3. A sample-and-hold coupling circuit—for coupling signals from an input circuit to an output circuit during a sampling interval and, upon termination of the sampling interval, for maintaining a constant signal condition at said output circuit corresponding to the condition of said input circuit during a predetermined brief interval preceding said termination of said sampling interval—comprising:

a normally disabled bridge circuit including first and second branch circuits connected in shunt with each other, the connections thereof defining a pair of control terminals, each said branch circuit including first and second similarly poled unidirectionally conducting devices connected in series, the junction of the unidirectional devices in said first branch circuit defining an input terminal and that in said second branch circuit defining an output terminal;

a first control circuit connected between said control terminals of said bridge including a pair of substantially identical, series-connected reverse voltage breakdown elements both poled to oppose the flow of current between said input and output terminals of said bridge in the absence of a breakdown potential thereacross, and means connected in series with said breakdown elements for applying sampling control signals to said elements; and a constant voltage source connected between said control terminals, for applying a reverse bias potential thereto with respect to both said unidirectionally conducting devices and said breakdown elements reducing the threshold required to be exceeded by said sampling control signals, before breakdown of said elements occurs, by an amount proportional to said constant voltage.

References Cited by the Examiner

UNITED STATES PATENTS 2,954,501   9/60   Pfeiffer _____ 315—22
2,965,771   12/60  Finkel _____ 307—88.5

DAVID G. REDINBAUGH, *Primary Examiner.*